US008041025B2

(12) United States Patent
Dolph et al.

(10) Patent No.: US 8,041,025 B2
(45) Date of Patent: Oct. 18, 2011

(54) SYSTEMS AND ARRANGEMENTS FOR CONTROLLING MODES OF AUDIO DEVICES BASED ON USER SELECTABLE PARAMETERS

(75) Inventors: Blaine H. Dolph, Western Springs, IL (US); Jennifer Martin, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 11/462,900

(22) Filed: Aug. 7, 2006

(65) Prior Publication Data

US 2008/0043996 A1    Feb. 21, 2008

(51) Int. Cl.
*H04M 1/00* (2006.01)

(52) U.S. Cl. ......... 379/390.01; 379/388.03; 379/390.03; 725/10; 725/12; 725/136; 381/57; 381/94.1; 704/275

(58) Field of Classification Search ............. 379/388.03, 379/388.06, 388.07, 390.03; 381/57, 30, 381/31, 56, 71; 455/570; 704/226, 229, 704/500; 700/245, 94
See application file for complete search history.

(56) References Cited

U.S. PATENT DOCUMENTS

| | | | |
|---|---|---|---|
| 5,182,552 A | | 1/1993 | Paynting |
| 5,907,622 A * | | 5/1999 | Dougherty ...................... 381/57 |
| 6,026,168 A | | 2/2000 | Li et al. |
| 7,003,123 B2 | | 2/2006 | Kanevsky et al. |
| 2001/0036254 A1 * | | 11/2001 | Davis et al. .................. 379/67.1 |
| 2002/0101537 A1 * | | 8/2002 | Basson et al. ................. 348/465 |
| 2002/0144259 A1 * | | 10/2002 | Gutta et al. ...................... 725/10 |
| 2003/0023741 A1 | | 1/2003 | Tomassetti et al. |
| 2003/0093814 A1 * | | 5/2003 | Birmingham ................. 725/136 |
| 2004/0107442 A1 * | | 6/2004 | Bayley ............................. 725/93 |
| 2004/0128402 A1 * | | 7/2004 | Weaver et al. ..................... 710/1 |
| 2004/0151328 A1 * | | 8/2004 | Hasegawa et al. .............. 381/86 |
| 2004/0158870 A1 * | | 8/2004 | Paxton et al. ................. 725/115 |
| 2004/0172648 A1 * | | 9/2004 | Xu et al. .......................... 725/38 |
| 2004/0208324 A1 | | 10/2004 | Cheung et al. |
| 2005/0038661 A1 * | | 2/2005 | Momosaki et al. ........... 704/275 |
| 2005/0063552 A1 * | | 3/2005 | Shuttleworth et al. .......... 381/57 |
| 2005/0063554 A1 * | | 3/2005 | Devantier et al. ............... 381/99 |
| 2005/0071626 A1 * | | 3/2005 | Bear et al. ...................... 713/100 |
| 2005/0086705 A1 * | | 4/2005 | Jarman et al. ................. 725/136 |
| 2005/0108026 A1 * | | 5/2005 | Brierre et al. ..................... 705/1 |
| 2005/0138133 A1 * | | 6/2005 | Voticky et al. ................ 709/207 |
| 2005/0187763 A1 * | | 8/2005 | Arun .............................. 704/226 |
| 2005/0226442 A1 * | | 10/2005 | Landon et al. ................ 381/104 |
| 2006/0023061 A1 | | 2/2006 | Vaszary et al. |
| 2006/0050142 A1 * | | 3/2006 | Scott et al. ................. 348/14.05 |
| 2007/0061352 A1 * | | 3/2007 | Dimitrova et al. ............ 707/102 |
| 2007/0089125 A1 * | | 4/2007 | Claassen ........................... 725/9 |
| 2009/0074378 A1 * | | 3/2009 | Momosaki et al. ............. 386/76 |

* cited by examiner

*Primary Examiner* — Ahmad F Matar
*Assistant Examiner* — Kharye Pope
(74) *Attorney, Agent, or Firm* — Heslin Rothenberg Farley & Mesiti P.C.

(57) ABSTRACT

Methods and arrangements for controlling modes of audio devices according to user selectable features are disclosed. The system can receive a user selection for an alternate mode for audio device. A monitor can monitor audio levels in a physical area and the system can automatically switch an audio device from a current mode to the alternate mode when the monitored audio level exceeds a predetermined threshold. The alternate mode can provide a higher audio level or volume than the current mode. The alternate mode can also be a closed caption mode, a record mode, and a transcript mode to name a few. Thus, when the ambient sound level reaches a predetermined level many audio devices can change modes based on user configured instructions.

19 Claims, 5 Drawing Sheets

SYSTEMS AND ARRANGEMENTS FOR CONTROLLING MODES OF AUDIO DEVICES BASED ON USER SELECTABLE PARAMETERS

FIELD OF INVENTION

The present disclosure is in the field of controlling audio levels and in particular to controlling audio levels of sound producing devices based on user selectable parameters.

BACKGROUND

The ability to hear a single important piece of information when multiple communications are in process is critical to many. For example, if one is listening to the radio or watching television and the phone rings, many would prefer to hear their phone ring so that they do not miss an important phone call. In another instance, someone may be watching a stock market report on television, trying to decide if they should buy or sell some stock when someone else in the home starts to blend a drink, vacuum a carpet or start some other household appliance that creates a significant amount of ambient noise. When this occurs, the listener/watcher often misses the desired content because the ambient or background noise obscures the desired content. Oddly enough, the ambient noise level in a home often becomes very high just as the information that the watcher has been waiting for is presented.

Another common phenomenon is when a sports fan is watching sports highlights or an important game and the furnace or air conditioning starts up, or someone comes into the room and blurts out a question, raising the ambient noise level such that the sports fan misses an important piece of information. Generally, as the noise level in a listening area increases the comprehensibility of the audio emitted from any given device decreases. To properly accommodate a listener, a constant manual adjustment of the audio level of devices is required by the user to make sure that audio devices are not too loud such as to annoy or too soft such that user misses or cannot hear desired information. Often a listener will not have a remote control for the audio device in hand to instantaneously adjust the volume based on any increase in the ambient noise level of audio. Even with a remote in a listener's hand, a user will often not be quick enough to increase the volume before the important information is missed because such phenomenon can happen very quickly.

Automatic volume control mechanisms have been utilized in telephone devices and in other audio devices such as car radios. More specifically, some convertible top cars have audio systems that increase the volume of the radio as the speed of the car increases. Such systems compensate for road and wind noise; however, these systems typically do not sense the ambient noise, but just relate the speed of the vehicle to the audio level provided.

This method of automatic volume control has many drawbacks. First, the ambient noise level is assumed based on testing and such a system does not utilize the actual ambient level to control the volume. If such a system utilized the ambient level, every time the driver talked to his passenger the radio volume would rise to the point where the driver could not carry on a conversation with the passenger. Also if a cell phone would ring the radio would increase its volume and the driver may not be able to carry on a conversation. Thus, an auto volume adjust system without some additional form of control would be impractical.

SUMMARY OF THE INVENTION

Generally, methods and arrangements for controlling audio in a user environment according to user selectable features are disclosed. An audio system can accept user selections regarding how to control multiple audio related components. One such user configurable aspect of the disclosure includes alternate modes that the audio devices can switch to when the ambient noise increases to a predetermined level. An audio level monitor can monitor audio levels in a physical area and the system can automatically switch the mode of at least one audio device from a current mode to the alternate mode when the monitored audio level exceeds the predetermined threshold.

In one embodiment, the alternate mode can be a mode that provides an increase in the audio level or an increase in volume above the normal operation mode or current mode for the selected audio device. The alternate mode can also be a closed caption mode, a record mode, and a transcript mode to name a few, such that the alternate mode provides an increased chance that content will be conveyed to the user when high ambient noise occurs. Further, when the ambient sound level reaches a predetermined level, multiple audio devices can change to one or more alternate modes based on the user selected configuration.

In another embodiment, an apparatus for controlling a plurality of audio devices is disclosed. The apparatus can include a user input device to accept at least one user selection. The user input can be user configurations that determine what audio devices will be controlled, how they will be controlled, and what criteria will be utilized to invoke such control. The apparatus can also include an audio level detector to measure an audio level, a compare module to compare the measured audio level with a user configured/predetermined audio level and a decision module to change a mode of at least one audio device based on a set of events such as the measured audio level exceeding the predetermined level.

A transducer or microphone placed proximate to a location suitable for the user can convert the ambient audio level or sound waves into an electrical signal useable by the audio level measurement module. The apparatus can also include a transmitter to transmit mode control signals to the at least one audio device to control or switch the audio device to at least one alternate mode. In one embodiment many different audio devices can switch modes. For example, a recorder might go from an "off" or standby mode to a record mode to capture a live presentation such that the content can be "re-presented" to the listener when improved conditions occur.

In another embodiment, a computer program product is disclosed that has a computer useable medium having a computer readable program. The computer readable program when executed on a computer can cause the computer to receive a user selection for a first normal operation mode and for a second alternate mode useable for audio recording or audio producing devices. The code can cause the computer to monitor audio levels in an area and cause the computer to automatically switch audio devices to different modes for example from a first mode to a second mode, based on the monitored audio level exceeding a predetermined/user configured threshold.

Also, the computer can automatically switch the mode of the device based on other user configurable setting such as a priority of the audio device. One alternate mode can include increasing the volume of the controlled audio device in response to an increase in ambient noise and another can be decreasing the volume of non-priority devices when the ambient noise level exceeds a predetermined threshold. Other alternate modes that can be implemented include a closed caption mode, an audio record mode, and a transcript recording mode. All of the alternate modes can attempt ways to preserve or provide content that would otherwise be unintelligible to the listener and most probably lost during periods of high ambient noise.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims. The descriptions below are designed to make such embodiments obvious to a person of ordinary skill in the art.

While specific embodiments will be described below with reference to particular configurations of hardware and/or software, those of skill in the art will realize that embodiments of the present invention may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Generally, methods and arrangements for controlling audio levels according to user selectable features are disclosed. The system can store a user preference for alternate modes useable by audio devices when the ambient noise increases to a predetermined level. An audio level monitor can monitor audio levels in a physical area and the system can automatically switch the mode of the audio device from a current mode to the alternate mode when the monitored audio level exceeds a predetermined threshold. In one embodiment the alternate mode can be a mode that provides an increase in the audio level or an increase in volume above the normal operation mode or current mode. The alternate mode can also be a closed caption mode, a record mode, and a transcript mode to name a few, such that the alternate mode provides an increased chance that content will be conveyed to the user when high ambient noise occurs. Further, when the ambient sound level reaches a predetermined level, multiple audio devices can change to one or more alternate modes based on user selectable configurations.

In another embodiment, an apparatus for controlling a plurality of audio devices is disclosed. The apparatus can include a user input device to accept at least one user selection or configuration. The user input can be user configurations that determine what audio devices will be controlled, how they will be controlled and what criteria will be utilized to invoke such control. The apparatus can also include an audio level detector to measure an audio level, a compare module to compare the measured audio level with a user configured/predetermined audio level and a decision module to change a mode of at least one audio device based on a set of events such as the measured audio level exceeding the predetermined level.

A transducer or microphone placed proximate to a location suitable for the user can convert the ambient audio level or sound waves into an electrical signal useable by the audio level measurement module. The apparatus can also include a transmitter to transmit mode control signals to the at least one audio device to control or switch the audio device to at least one alternate mode. In one embodiment many different audio devices can switch modes. For example, a recorder might go from an "off" or standby mode to a record mode to capture a live presentation such that the content can be "re-presented" to the listener when improved conditions occur, if desired.

In another embodiment, a computer program product is disclosed that has a computer useable medium having a computer readable program. The computer readable program when executed on a computer can cause the computer to receive a user selection for a first normal operation mode and for a second alternate mode useable for audio recording or audio producing devices. The code can cause the computer to monitor audio levels in an area and cause the computer to automatically switch audio devices to different modes for example from a first mode to a second mode, based on the monitored audio level exceeding a predetermined/user configured threshold.

Also, the computer can automatically switch the mode of the device based on other user configurable setting such as a priority of the audio device. One alternate mode can include increasing the volume of the controlled audio device in response to an increase in ambient noise and another can be decreasing the volume of non-priority devices when the ambient noise level exceeds a predetermined threshold. Other alternate modes that can be implemented include a closed caption mode, an audio record mode, and a transcript recording mode. All of the alternate modes can attempt ways to preserve or provide content that would otherwise be unintelligible to the listener and most probably lost during periods of high ambient noise.

Figure 1:
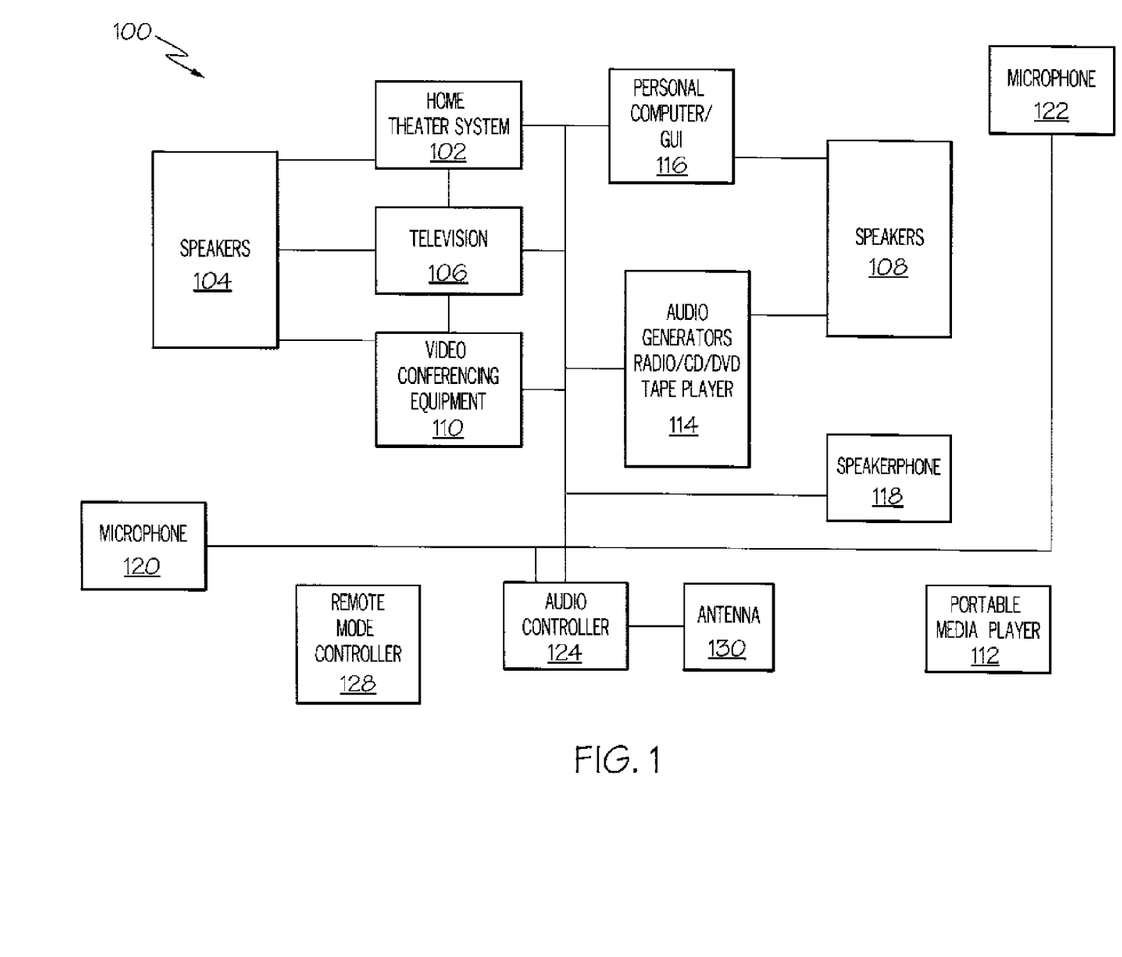
FIG. 1 depicts a block diagram of a system for controlling audio levels based on user defined parameters.

Referring to FIG. 1, a system for controlling audio levels based on user selectable parameters is disclosed. The system can include a plurality of transducers or microphones represented by microphone 120 and microphone 122 that can sense the ambient noise in an area, such as a living room or a bedroom of a home. The microphones 120 and 122 can convert the ambient noise present in the assigned area into an electrical signal. Thus, microphone 120 and 122 could be any kind of device that can convert sound waves into electrical signals such that an electrical signal representing the ambient noise level can be provided to audio controller 124.

Audio controller 124 can connect to, and control modes of, audio devices or any device associated with the processing of audio. Such audio devices can include video conferencing equipment 110, television 106, home theater system 102, speakers 104 and 108, personal computer 116, audio generators 114, portable media player 112, phone/speaker phone 118 and any other device that can receive, produce, convert, or transmit a signal related to an audio signal. Audio generators 114 represents a class of audio devices such as a radio, a compact disc (CD) player, a digital video disk (DVD) player, a musical instrument, an amplifier, a mixer, a digital audio player, and a cassette tape player.

In one embodiment, a graphical user interface or browser on the personal computer 116 can provide a user interface, such that a user can configure system preferences. The user interface could also be implemented by any device or combination of devices that can accept user input, display selections, and display user input. For example, the display portion of the television 106 could display options and selections to a user that is utilizing remote mode controller 128 (i.e. a universal TV remote) to enter such system configurations.

This operation could be performed in a manner similar to the way modern televisions conduct a set-up with user interactions. For example, the television 106 could have a menu that provides a series of set up questions where the user can reply to the majority of questions with a yes or no answer. This set up process could also be facilitated by a plug and play system where devices that are proximate to the user could automatically "register" with a hub in the system utilizing a wireless local area network connection.

User preferences or user configurable options can include what audio device will take priority in a high noise environment and what mode changes can be implemented by each audio device in response to such a high noise environment. For example, in the event that a high level of ambient noise is detected by audio controller 124, per the user configuration, the audio controller 124 can send a control signal that will control the video conferencing equipment 110 such that the video conferencing equipment repeats the audio that was presented when the high ambient noise occurred.

In one embodiment, battery operated remote audio controller 124 can detect the ambient noise and send control signals to audio devices such as the PC 116, the home theater system 102, the television 106, the video conferencing equipment 110, and the audio generators 114, possibly increasing one audio device and muting the others. Such audio devices can have an interface to accept control signals from the battery operated remote audio controller 124 and the audio devices can respond to such a signal and change a mode of operation in response to such a control signal. In one embodiment, the volume of one audio device can be increased and the volume or audio level of the rest of the audio devices in a room can be decreased.

In some embodiments, these audio devices can be controlled via a wired connection and in other embodiments the audio devices can communicate via a wireless connection such as a "Bluetooth®", infrared technology, or a WLAN type connection. For example, portable media player 112, such as an MP3 player or IPOD® may have a volume or mode controllable via the Bluetooth wireless protocol. Thus, a control signal from the remote mode controller 128 or the audio controller 124 could be transmitted via infrared technology or via low power digital radio frequency technology utilizing an antenna such antenna 130.

Modes of audio devices can include a simple on/off mode, a mute mode, a lower volume mode, an increase volume mode, a closed caption mode, a record mode, a repeat mode, a transcript mode, a mute mode and a pause mode to name a few. As stated above, when higher than normal ambient noise occurs it can be beneficial to switch some or all of the audio devices into different modes. As a result, priority content may either be heard by the listener or may be preserved for later play by the listener.

In another embodiment, PC 116 may communicate and change modes of audio devices via a wireless local area network (WLAN) protocol. For example, the PC 116 could place the television 106 in a closed caption mode and an increase volume mode in response to detecting a high ambient noise level, such that a user does not miss important content due to high ambient noise levels.

Thus, during operation, when a user has an audio processing device such as television 106 selected as a priority device, and the ambient level noise level from non-priority or other audio producers, such as appliances or a person, raise the ambient noise or audio level above a predetermined level, then at least one audio device can be automatically switched to a different or alternate mode by an audio controller based on user configurable settings. The alternate mode can include raising the volume of the priority device to a predetermined decibel level, or to a decibel level that is a predetermined amount above the ambient level. Other mode changes can include placing a "non priority" device into a recording mode, in a closed caption mode or into a transcript mode. In other embodiments, any or all of the audio devices can be controlled and can undergo one or more mode changes based on a control signal or control signals from audio controller 124.

Figure 2:
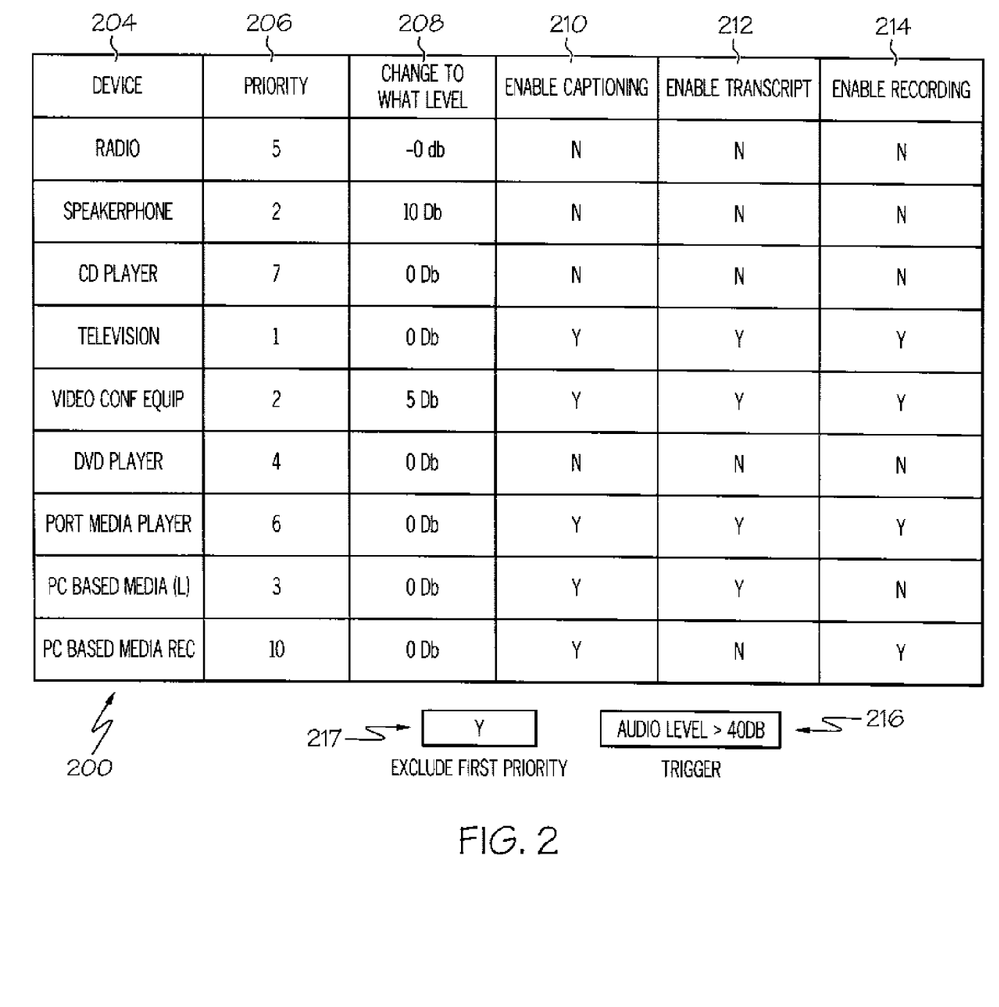
FIG. 2 illustrates an embodiment of a graphical user interface that could be utilized to set user preferences in an audio control system.

Referring to FIG. 2, a chart 200 that could be utilized by a user to set triggers for mode changes, set normal operating modes, and alternate modes for audio devices is disclosed. The audio devices that can be mode controlled are listed in column 204. For example, the system may have a radio, a speakerphone, a CD player, a television etc. Column 206 can define the priority of each audio device listed in column 204. The device with the highest priority, the television in the illustrated example, can be a device that the user designates as the most important device to hear in the event of excessive ambient noise.

In one embodiment, the predetermined ambient noise level that will trigger an alternate condition or a mode change of one or more devices can be entered in block 216. Other triggers could also be utilized such as a power outage, an equipment malfunction, or a loss of signal. Such a trigger can be set by type of event and magnitude of event. For ambient noise as a trigger, the magnitude could be, say 40 decibels or it could be a percentage increase or shift from, a normal or current decibel level.

In one embodiment, the user can select whether the audio contribution from the priority device to the ambient noise is to be subtracted from the ambient noise level. By placing a "Y" in the box 217 a user can select such a feature. Accordingly, as the audio level of the priority device increases and no other noise producing devices increase their volume, the ambient noise should not increase.

Column 208 can provide modes regarding what audio level in decibels the device in column 204 will rise to, or fall to if the triggering event occurs. In the example, the triggering event can be a detected audio level of over 40 Db. However, any audio level could be selected. In addition, specific levels of sound at specific frequencies could be entered as a triggering event. Thus, the trigger can have a predetermined user selectable threshold.

Column 210 allows a user to select closed captioning as a mode that can be enabled for specific devices within the system, by placing a Y for enablement in the enable closed captioning column. Column 212 allows a user to select or enable a transcript mode as an alternate mode for devices in the system. A transcript mode can take sound, utterances or speech as an input, and utilize a speech to text converter to create a "written," "typed," or textual transcript of the audio that could be viewable, for example, on the display of a personal computer or even a remote control device.

Column 214 allows a user to select or enable an audio recording mode where the audio can be digitally recorded when a high level of ambient noise is detected such that, "what was missed" or "not heard" can be re-played at a future time at the user's convenience. Any device could implement an alternate mode if capable, not just the highest priority device. For example, an audio recording could be performed for audio devices that do not have a display, or where closed captioning or a textual representation of audio is not possible. Additionally, the audio recording can be important for audio devices that are receiving live broadcasts, where if nothing is recorded the content cannot be reproduced.

Figure 3:
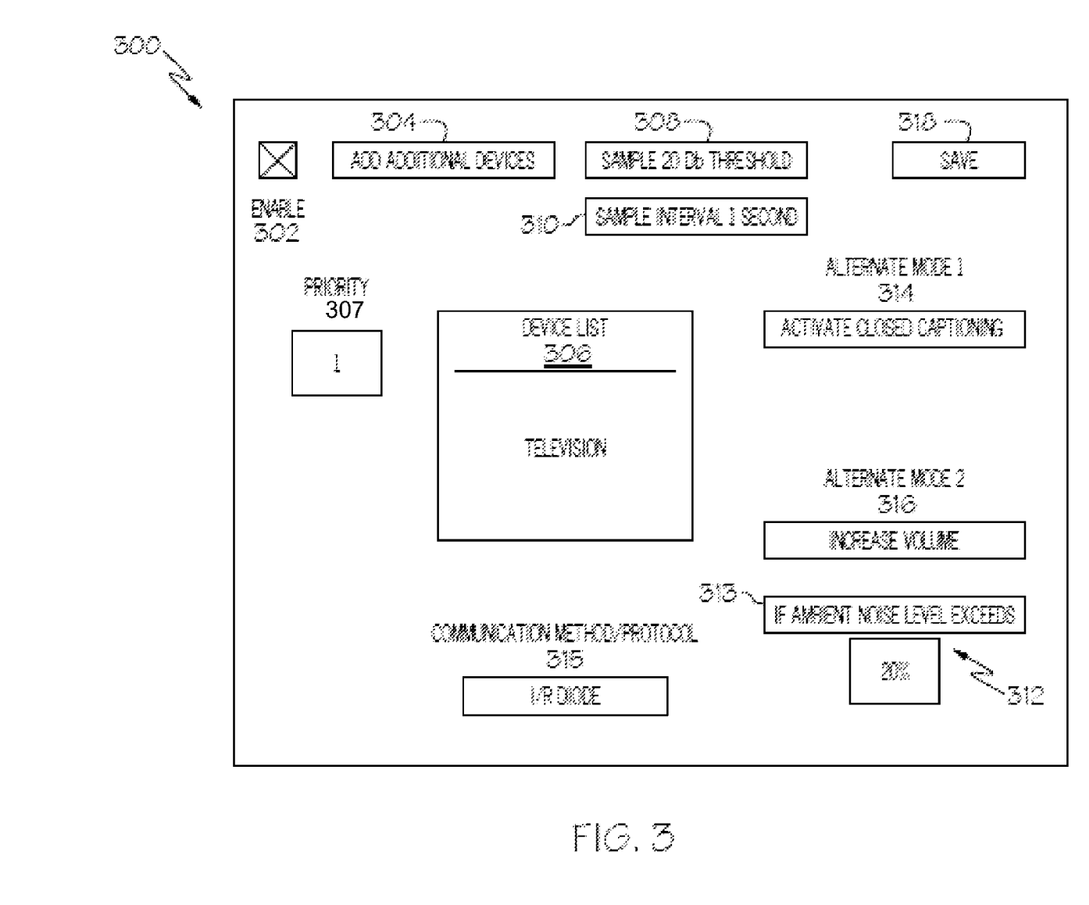
FIG. 3 depicts another embodiment of a graphical user interface that could be utilized to set user preferences in the audio control system.

Referring to FIG. 3, another user interface which is similar to a browser environment is disclosed. The user can create a system by adding audio devices to a list of controllable audio devices. These audio devices should be controllable via some form of remote input and if not, the device speaker output cable could be connected to a "volume controller" that will intercept the signal before it connects to the speakers such that, at least the volume of the uncontrolled device can be regulated. In this embodiment, a user can turn the audio event system controller "on and off" via a selectable enable button 302.

Thus, when configuring a system or when it is desired to add a component or an audio device to the system, the user can place the cursor in block 304 and type in the name of the audio device. Once a device is added it can appear in a pull down audio device list 306 and attributes or features can be assigned to the device. In the described embodiment "Television" has been added to the list and is the "selected" device from the list of devices in the pull down menu 306. When a device is selected and viewable in device list 306, many mode related user configurable parameters can be assigned to the selected device. The user may enter the priority of the device in priority block 307.

For example, since each device on the device list may have a different method of communicating and utilize a different protocol, the user can select or enter the method and protocol in the communication method/protocol entry box 315. For a television, the communication method may be an infrared diode for a class B universal remote. The user can enter this information into box 315.

Box 315 could also provide a pull down menu that has many communication standards for the selected audio device and the user could select the appropriate communication topology from the pull down menu. In other embodiments a wireless or wired local area network could utilize a "plug and play" type format to populate the device list 304 and to configure the communication topologies.

Alternate mode 1 data entry box 314 can define one mode that the selected device will switch to when an event occurs or a particular set of circumstances occur. For example, the television might switch to a closed captioning mode according to the type of trigger in trigger box 313 and by the threshold level in box 312. The threshold level in box 312 is set such that when a level of ambient noise rises 20%, the alternate modes can be triggered. The second alternate mode may have a different trigger and a different trigger level than the trigger set for the first alternate mode.

Thus, second alternate mode selection box 316 provides a user with the ability to switch an audio device to a second alternate mode responsive to a different event than triggers the first alternate mode, although the illustrated example only shows one trigger. Accordingly, in the illustrated example, responsive to the user setting for the second alternate mode in box 316, the television can increase its volume in the event that the ambient noise level exceeds a predetermined threshold defined in box 312. In another embodiment, instead of utilizing a percentage increase in the ambient audio level as a trigger, the user can define an actual ambient noise level (another predetermined level) that will trigger at least one mode change in at least one audio device.

To test the trigger in the illustrated example, a predetermined threshold ambient noise value, the user can activate selectable button 308. In response, the system can create some form of audio with the predetermined decibel level such that the user can determine if this ambient noise level will "muffle" or mask the audio from the selected device (i.e. the television in the example). The selected device can be set to provide audio at its normal level and activation of the sample baseline button 308 can provide ambient noise so that the user can test the system to determine if the selected device can be heard above the selected ambient noise level trigger in box 312. The sample interval box 310 can allow a user configurable time sample interval that dictates how often the system will sample the ambient noise. Upon completion of the user configuring the system, the user can select the save settings button 318 to save the selected configurations.

Figure 4:
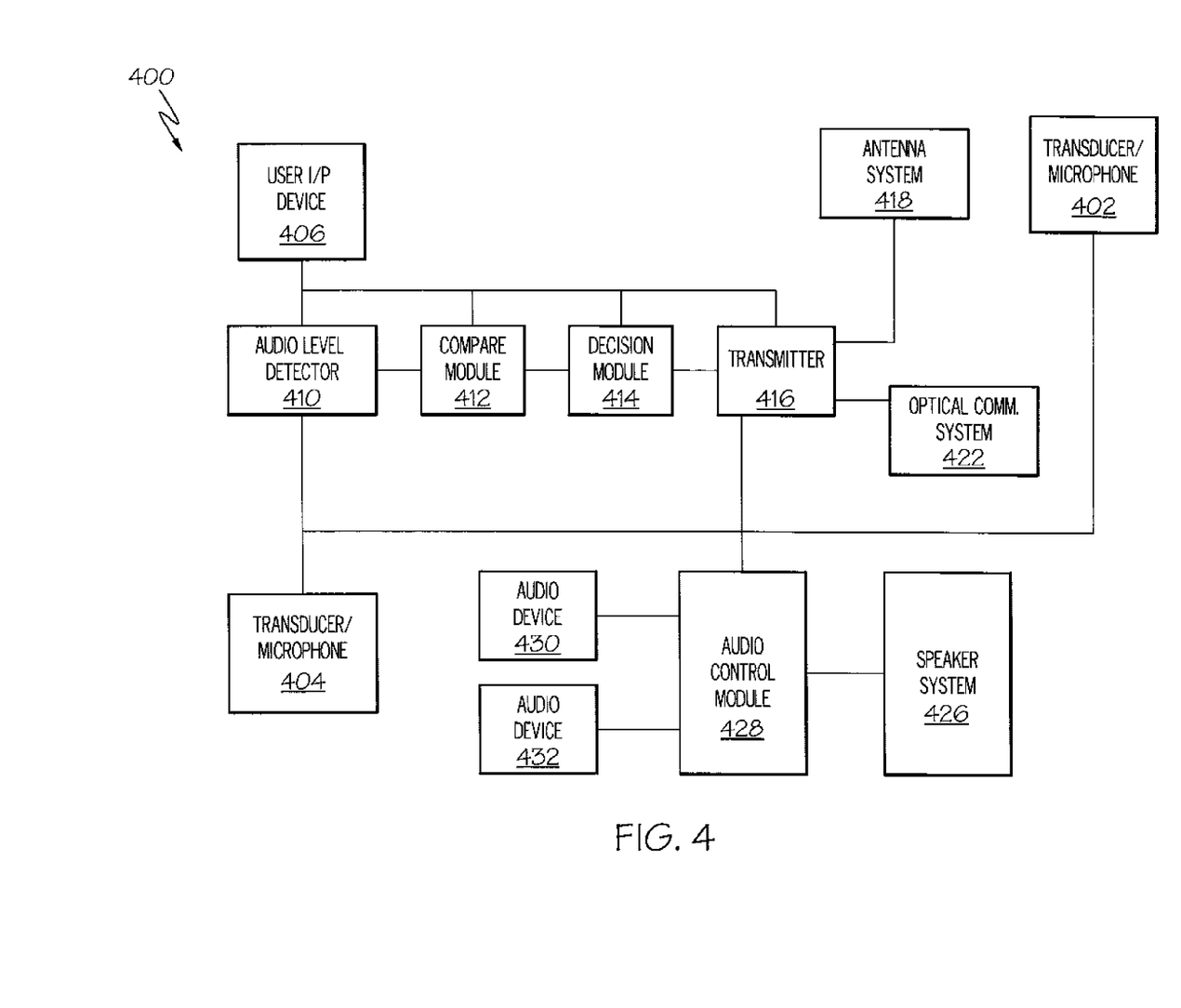
FIG. 4 illustrates an apparatus that can control audio devices.

Referring to FIG. 4 an apparatus 400 for controlling audio is disclosed. The apparatus 400 can include microphone 404, microphone 402, audio level detector 410, compare module 412, decision module 414 and transmitter 416. The transmitter 416 can utilize antenna 418, an optical communication system 422, or hard wire connection such as the one connected to audio control module generator 428, to facilitate mode control of audio devices such as the audio devices illustrated in FIG. 1.

In operation, microphones 402 and 404 can sense the ambient level of audio in an area, and send an electrical signal representing the ambient noise level to the audio level detector 410. The audio level detector 410 can provide a digital signal to the compare module 412 where the compare module can compare the ambient noise level with a predetermined user configured level. The user can configure this predetermined threshold level via user input device 406.

When the compare module 412 determines that the ambient noise level is greater than the predetermined level or preconfigured user setting the compare module 412 can send out such an indication to decision module 414. Decision module 414 can utilize mode settings and communication format settings accepted from the user via user input device 406 to properly activate transmitter 416. Control signal sent by transmitter 416 can be sent to and received by audio devices. In the illustration of FIG. 4 the audio control module 428 is one such audio device.

Transmitter 416 can send multiple control signals to multiple audio devices such that multiple modes changes of multiple audio devices can be made to change modes of audio devices as the user desires. Thus, there can be a high likelihood that the user can receive important content and such content will not be lost. In one embodiment, the audio outputs of audio devices 430 and 432 can be connected to audio control module 428 which can act as a switch or an amplifier and control the audio level sent to the speaker system 426 responsive to the output of the transmitter 416.

In one embodiment the audio detector 410 can determine the audio level of specific audio devices. For example, the audio detector 410 can determine the level of the priority device. When the audio level detector 410 is determining the level of ambient noise the audio from the priority device can be subtracted from the ambient noise level because generally the audio from the priority device should not be considered as noise. As can be appreciated, if the volume of the priority device increases this should not raise the level of the ambient noise. Thus, to subtract the audio of the priority device from the calculation of the ambient noise level can provide many additional benefits.

Figure 5:
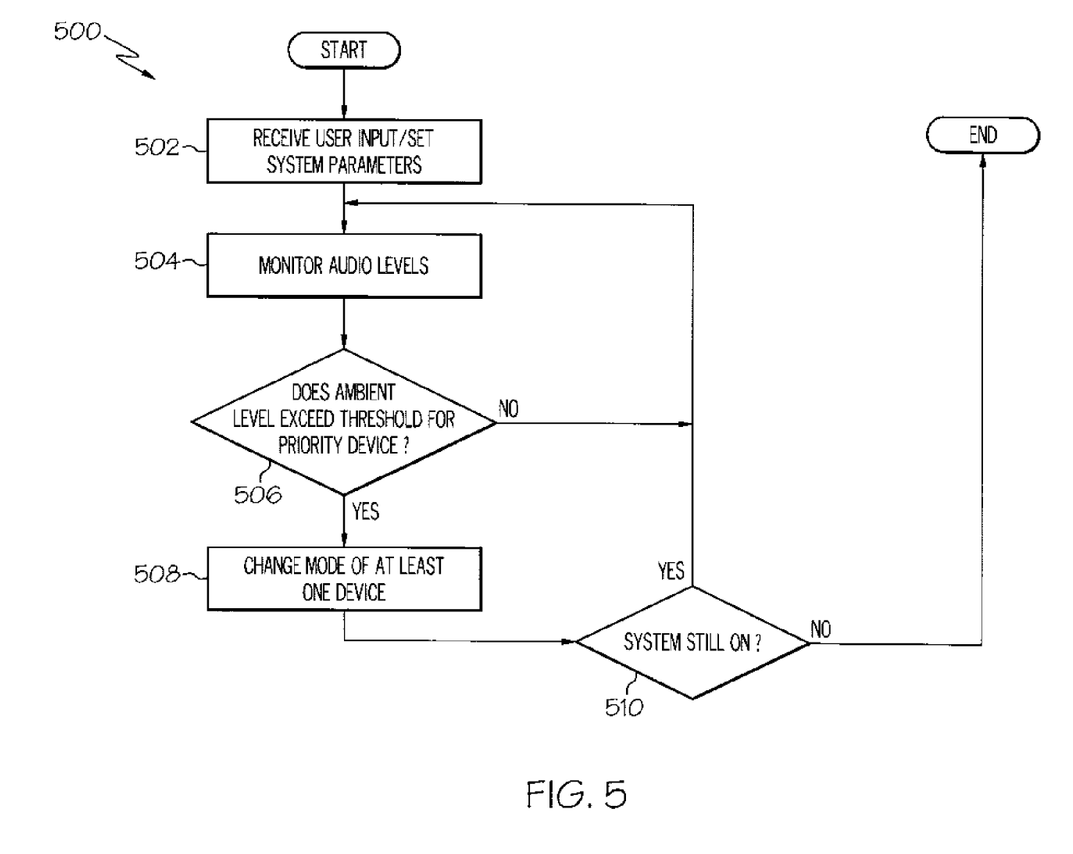
FIG. 5 is a flow chart depicting one method for controlling audio levels.

Referring to FIG. 5 a flow chart 500 for controlling audio of multiple audio devices is disclosed. As illustrated by block 502, user input can be received and stored by the audio control system. The user input can configure or set system parameters such as identifying priority devices, types of triggers, trigger thresholds and multiple mode changes to be performed on multiple devices.

In one example, a priority device can be a speaker phone. The ringer and the volume of the voice speaker of the speaker phone can be the audio deemed most important by the user and the speaker phone can be assigned a priority of one. Then, the user may configure a trigger, a trigger level and a mode for the speaker phone to switch to. A first trigger may be ambient noise with a trigger level of 30 Db and a second trigger may be phone numbers with a trigger level of important phone numbers.

To provide such a service the audio system can monitor audio levels as illustrated by block 504. In one embodiment, the audio emanating from the priority device can be subtracted from the ambient level to provide a more accurate control of audio proximate to a user. In decision block 506, the audio system can determined if the ambient noise level exceeds the predetermined threshold. Again this decision can consider the contribution that the priority device makes to the ambient noise. If the ambient noise level does not exceed the threshold level, the system can revert back to block 504 and continue to monitor audio levels.

When the system determines that the ambient level of sound exceeds the predetermined threshold at decision block 506, a mode or multiple modes of an audio device can be changed as illustrated by block 508. In accordance with the parameter set configuration described with reference to block 502 above for the speaker phone, such a user selected configuration can switch modes when a high ambient audio level is present and a call is being received from an important party.

Thus when a phone call is received with an important number according to the caller ID, and the ambient noise level is above the threshold, devices configured with lower priorities could go into a mute mode and the ringer and speaker of the speaker phone could rise in volume such that the ring from the speaker phone and the party calling can be heard and a communication can be made with an important client with minimal audio interference. Generally the alternate mode can be a mode that modifies an audio output; for example, changes a volume, records audio or changes an audio signal into text.

After the mode has been changed the system can continue to monitor audio levels at block 504 if the system is still active as determined by decision block 510. The process can end when the system is turned off.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive) Such signal-bearing media, when carrying computer-readable instructions that direct the functions of the present invention, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods, systems, and media that allow a user to auto-title an audio recording. It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
   an audio controller providing user-configurable settings for designating each of a plurality of devices with audio output as either a priority device or a non-priority device;
   the audio controller providing options for user-configurable alternate modes for each of the devices in case of an ambient noise level becoming greater than a predetermined threshold, wherein the options provided for alternate modes comprise an increased volume mode wherein an audio output volume of a priority device is increased, and a plurality of selectable non-priority modes that may be applied to each of one or more devices designated as non-priority devices, in which the selectable non-priority modes provided as options by the audio controller comprise:
    decreasing or muting a volume of audio output of a non-priority device;
    turning off the non-priority device;
    enabling a display or recording of text corresponding to a current audio output of the non-priority device;
    enabling recording of a current audio output of the non-priority device; and
    enabling pausing of a current audio output of the non-priority device;
the audio controller receiving a user input designating one of the devices as the priority device;
the audio controller receiving one or more user inputs designating one or more of the non-priority modes for one or more non-priority devices;
the audio controller monitoring the ambient noise level;
the audio controller determining whether the ambient noise level is greater than the predetermined threshold; and
the audio controller, in response to determining that the ambient noise level is greater than the predetermined threshold:
    automatically switching the priority device to the increased volume mode; and
    automatically switching the one or more non-priority devices to the one or more non-priority modes designated by the user for each of the one or more non-priority devices.

2. The method of claim 1, wherein the audio controller determining whether the ambient noise level is greater than the predetermined threshold comprises measuring the predetermined threshold in decibels and comparing the ambient noise level to the predetermined threshold.

3. An apparatus comprising:
a user input device operative to accept user-configurable settings designating each of a plurality of devices with audio output as either a priority device or a non-priority device;
an audio controller for providing user-configurable settings for designating each of a plurality of devices configured for audio output as either a priority device or a non-priority device, and for providing options for user-configurable alternate modes for each of the devices in case of an ambient noise level becoming greater than a predetermined threshold, wherein the options provided for alternate modes comprise an increased volume mode wherein an audio output volume of a priority device is increased, and a plurality of selectable non-priority modes that may be applied to each of one or more devices designated as non-priority devices, in which the selectable non-priority modes provided as options by the audio controller comprise:
    decreasing or muting a volume of audio output of a non-priority device;
    turning off the non-priority device;
    enabling a display or recording of text corresponding to a current audio output of the non-priority device;
    enabling recording of a current audio output of the non-priority device; and
    enabling pausing of a current audio output of the non-priority device;
wherein the audio controller is further configured for receiving one or more user inputs designating one of the devices as the priority device, and designating one or more of the non-priority modes for one or more non-priority devices;
an audio level detector operative to measure the ambient noise level;
a compare module operative to compare the ambient noise level to the predetermined threshold and determine whether the ambient noise level is greater than the predetermined threshold;
a decision module operative to, in response to determining that the ambient noise level is greater than the predetermined threshold:
    automatically switch the priority device to the increased volume mode; and
    automatically switch the one or more non-priority devices to the one or more non-priority modes designated by the user for each of the one or more non-priority devices.

4. The apparatus of claim 3, further comprising a transmitter operative to transmit a mode control signal to one or more of the devices.

5. The apparatus of claim 3, further comprising an audio control module having an output, wherein the audio control module is operative to receive a control signal from the decision module, wherein the audio control module is further operative to receive at least one audio signal from at least one of the devices, and wherein the audio control module is further operative to control an audio signal at the output of the audio control module responsive to the control signal.

6. A computer program product for controlling audio, the computer program product comprising:
one or more computer-readable tangible storage devices;
program instructions, stored on at least one of the one or more tangible storage devices, to provide user-configurable settings for designating each of a plurality of devices with audio output as either a priority device or a non-priority device;
program instructions, stored on at least one of the one or more tangible storage devices, to provide options for user-configurable alternate modes for each of the devices in case of an ambient noise level becoming greater than a predetermined threshold, wherein the options provided for alternate modes comprise an increased volume mode wherein an audio output volume of a priority device is increased, and a plurality of selectable non-priority modes that may be applied to each of one or more devices designated as non-priority devices, in which the selectable non-priority modes provided as options comprise:
    decreasing or muting a volume of audio output of a non-priority device;
    turning off the non-priority device;
    enabling a display or recording of text corresponding to a current audio output of the non-priority device;
    enabling recording of a current audio output of the non-priority device; and
    enabling pausing of a current audio output of the non-priority device;
program instructions, stored on at least one of the one or more tangible storage devices, to monitor an ambient noise level;
program instructions, stored on at least one of the one or more tangible storage devices, to determine whether the ambient noise level is greater than the predetermined threshold; and
program instructions, stored on at least one of the one or more tangible storage devices to, in response to determining that the ambient noise level is greater than the predetermined threshold, automatically switch a designated priority device to the increased volume mode;

program instructions, stored on at least one of the one or more tangible storage devices to, in response to determining that the ambient noise level is greater than the predetermined threshold, automatically switch the one or more non-priority devices to the one or more non-priority modes designated by the user for each of the one or more non-priority devices.

7. The computer program product of claim 6, wherein the non-priority mode for enabling a display or recording of text corresponding to a current audio output of the non-priority device comprises a closed caption mode.

8. The computer program product of claim 6, wherein the non-priority mode for enabling a display or recording of text corresponding to a current audio output of the non-priority device comprises a transcript mode.

9. The computer program product of claim 6, further comprising:
program instructions, stored on at least one of the one or more tangible storage devices, to receive inputs designating a first one of the non-priority modes for a first one of the non-priority devices and a second one of the non-priority modes for a second one of the non-priority devices.

10. The method of claim 1, further comprising:
the audio controller receiving inputs designating a first one of the non-priority modes for a first one of the non-priority devices and a second one of the non-priority modes for a second one of the non-priority devices.

11. The method of claim 1, further comprising the audio controller receiving a user specification of a protocol for communicating with at least one of the devices.

12. The method of claim 1, further comprising:
the audio controller generating from at least one of the devices a first audio device sound at a first audio level;
the audio controller emitting a sample sound at a predetermined audio level; and
the audio controller determining if the first audio device sound is audible above the sample sound.

13. The apparatus of claim 3, wherein the user input device is operative to receive inputs designating inputs designating a first one of the non-priority modes for a first one of the non-priority devices and a second one of the non-priority modes for a second one of the non-priority devices.

14. The apparatus of claim 5, further comprising a speaker system, wherein the audio control module, responsive to the control signal, controls an audio level sent to the speaker system.

15. A computer system comprising one or more processors, one or more computer-readable memories, one or more computer-readable tangible storage devices and program instructions which are stored on the one or more tangible storage devices for execution by the one or more processors via the one or more memories and when executed by the one or more processors perform the method of claim 1.

16. A computer program product comprising one or more computer-readable tangible storage devices and computer-readable program instructions which are stored on the one or more tangible storage devices and when executed by one or more processors perform the method of claim 1.

17. The apparatus of claim 3, further comprising:
a sound emitter operative to emit a sample sound at a predetermined audio level; and
wherein the decision module is further operative to determine whether a sound generated by at least one of the devices is audible above the sample sound.

18. The method of claim 1, wherein the audio controller receiving the user input designating one of the devices as the priority device and the one or more user inputs designating one or more of the non-priority modes for one or more non-priority devices comprises providing a menu that provides a series of set up questions.

19. The method of claim 1, further comprising automatically registering proximate devices over a wireless connection prior to the audio controller providing the user-configurable settings for designating the proximate devices as either a priority device or a non-priority device and providing options for user-configurable alternate modes for each of the proximate devices.

* * * * *